United States Patent
Jones

(10) Patent No.: US 10,173,704 B2
(45) Date of Patent: Jan. 8, 2019

(54) LIFTING APPARATUS

(71) Applicant: John Jones, Wombourne, Staffordshire (GB)

(72) Inventor: John Jones, Wombourne, Staffordshire (GB)

(73) Assignee: John Jones, Wombourne (GB)

( * ) Notice: Subject to any disclaimer, the term of this patent is extended or adjusted under 35 U.S.C. 154(b) by 3 days.

(21) Appl. No.: 15/023,100

(22) PCT Filed: Sep. 12, 2014

(86) PCT No.: PCT/GB2014/052782
§ 371 (c)(1),
(2) Date: Mar. 18, 2016

(87) PCT Pub. No.: WO2015/036787
PCT Pub. Date: Mar. 19, 2015

(65) Prior Publication Data
US 2016/0229436 A1 Aug. 11, 2016

(30) Foreign Application Priority Data
Sep. 16, 2013 (GB) .................................. 1316467.8

(51) Int. Cl.
*B62B 1/06* (2006.01)
*B62B 1/14* (2006.01)
(Continued)

(52) U.S. Cl.
CPC .................. *B62B 1/06* (2013.01); *B62B 1/14* (2013.01); *B62B 1/264* (2013.01); *B65G 7/08* (2013.01);
(Continued)

(58) Field of Classification Search
CPC .. B62B 1/06; B62B 1/14; B62B 1/264; B62B 5/0003; B62B 2202/022; B62B 2203/70; B65G 7/08
(Continued)

(56) References Cited

U.S. PATENT DOCUMENTS 2,651,427 A * 9/1953 Butler ..................... B62B 1/264
254/113
2,888,157 A * 5/1959 Riley ..................... B65G 67/46
414/648
(Continued)

FOREIGN PATENT DOCUMENTS

DE  4414015 A1  10/1995
DE  19926632 A1 * 12/2000  ............... B62B 3/06
(Continued)

OTHER PUBLICATIONS

Dawn Groves, Making Knowledge Work, "GasGrab Project, Postural Loading (Handler) Whilst Manually Lifting and Lowering a Gas Cylinder",University of Bradford, Jul. 9, 2007, 34 pages.
(Continued)

*Primary Examiner* — James Keenan
(74) *Attorney, Agent, or Firm* — Finch & Maloney PLLC

(57) ABSTRACT

A lifting apparatus, such as may be used with gas cylinders such as welding gas cylinders, comprising a frame (1) and a carriage (3), the carriage being mounted on the frame through a mounting (9), the mounting (9) allowing the carriage (3) to rotate relative to the frame (1) and to slide linearly relative to the frame (1) constrained to a path, the carriage (3) being provided with a loading surface (2, 12, 24) for a load (101). The mounting may comprise a bar (19) typically on the carriage (3) held captive in a track (25) typically on the frame (1).

19 Claims, 7 Drawing Sheets

(51) Int. Cl.
  *B62B 1/26* (2006.01)
  *B65G 7/08* (2006.01)
  *B62B 5/00* (2006.01)

(52) U.S. Cl.
  CPC ....... *B62B 5/0003* (2013.01); *B62B 2202/022* (2013.01); *B62B 2203/70* (2013.01)

(58) Field of Classification Search
  USPC ................ 280/79.6; 414/424, 652, 653, 656
  See application file for complete search history.

(56) References Cited

U.S. PATENT DOCUMENTS

| | | | | |
|---|---|---|---|---|
| 3,279,635 | A * | 10/1966 | Avery | B65G 65/23 |
| | | | | 414/648 |
| 3,868,033 | A * | 2/1975 | Le Duff | B65G 65/23 |
| | | | | 414/420 |
| 4,036,382 | A * | 7/1977 | Perry | B66F 9/02 |
| | | | | 414/420 |
| 4,348,147 | A * | 9/1982 | Helm | B65G 65/00 |
| | | | | 414/420 |
| 4,865,339 | A * | 9/1989 | Rundborg | B62B 5/0003 |
| | | | | 280/47.21 |
| 5,489,183 | A * | 2/1996 | Malden | B62B 1/264 |
| | | | | 280/47.28 |
| 9,126,755 | B2 * | 9/2015 | Walter | B65F 1/1452 |
| 9,242,662 | B2 * | 1/2016 | Scott | B62B 1/16 |
| 2003/0127834 | A1 | 7/2003 | Click | |
| 2003/0151218 | A1 | 8/2003 | Swaffield | |
| 2007/0292247 | A1 | 12/2007 | Wilson | |
| 2010/0327544 | A1 * | 12/2010 | Pebworth | B62B 1/14 |
| | | | | 280/6.151 |

FOREIGN PATENT DOCUMENTS

| | | |
|---|---|---|
| EP | 1988000 A1 | 5/2008 |
| FR | 2859437 A1 | 3/2005 |
| GB | 2407529 A | 4/2005 |
| WO | 2015036787 A1 | 3/2015 |

OTHER PUBLICATIONS

International Search Report and Written Opinion received for Patent Application No. PCT/GB2014/052782, dated Dec. 23, 2014. 10 pages.

* cited by examiner

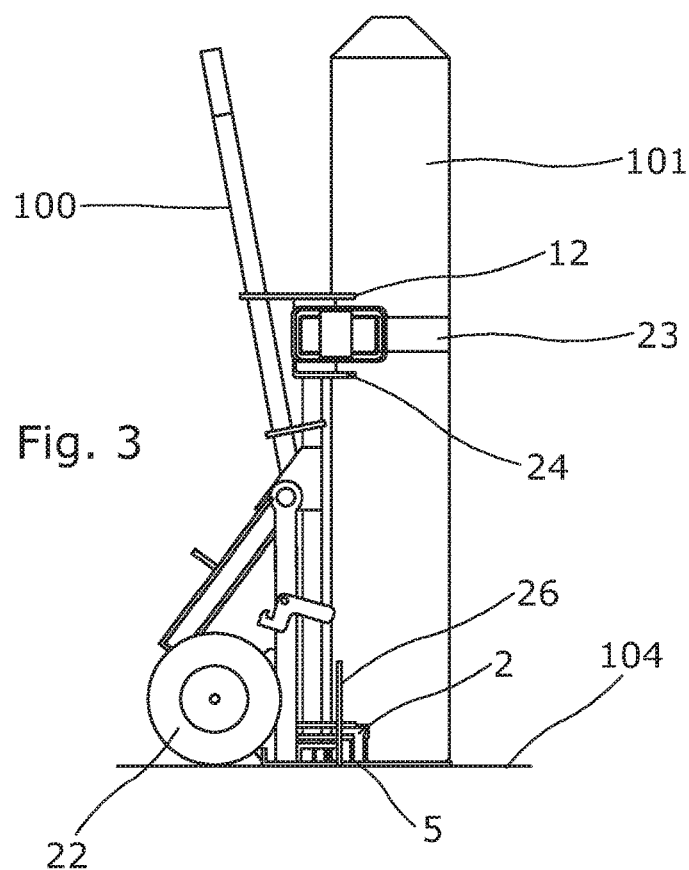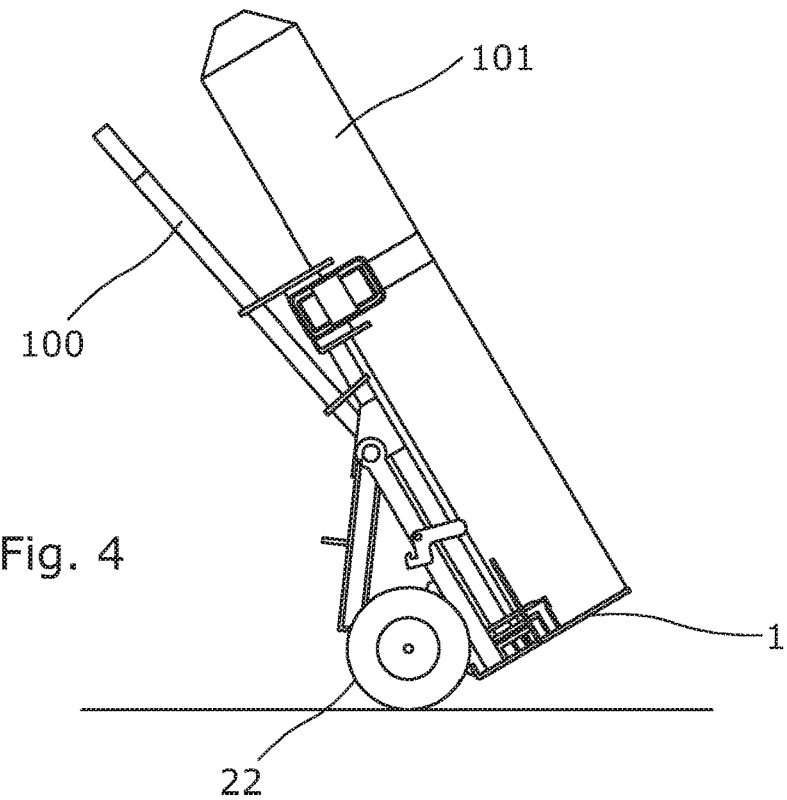

LIFTING APPARATUS

CROSS-REFERENCE TO RELATED APPLICATIONS

This application is a 371 of International Application No. PCT/GB2014/052782, titled LIFTING APPARATUS, filed on Sep. 12, 2014, which claims priority to Great Britain Patent Application No. 1316467.8, titled LIFTING APPARATUS, filed on Sep. 16, 2013. Each of these applications is herein incorporated by reference in its entirety.

FIELD OF THE DISCLOSURE

This invention relates to lifting apparatus, typically but not exclusively for use in lifting loads such as gas cylinders.

BACKGROUND

It is known to use argon and other inert gassing when welding; such gasses protect the molten metal from the effect of atmospheric gasses such as oxygen. Such inert gasses are provided in large gas cylinders; typical industrial mobile welding appliances make use of cylinders whose mass when full is typically in the region of 86 kilograms. Replacing these cylinders represents a manual handling risk; generally, it is required to remove the empty cylinder from a platform on the welding appliance to be stored for refilling and subsequently lifting a new full cylinder onto to the platform. This manual handling task has been assessed as an exceptionally high risk (Postural Loading (Handler) Whilst Manually Lifting and Lowering a Gas Cylinder, Dawn Groves, University of Bradford, available online at: http://gasgrab.com/Bfd%20Uni%20Full%20Project.pdf).

Various means have been proposed for dealing with this problem. The United Kingdom Patent Application published as GB 2 407 529 provides one or two handles that fit onto a gas cylinder; this still requires manual lifting by a user. Various trolley-based solutions have been proposed, generally involving a platform that is raised by a winch or by hydraulic means; see, for example, the European Patent Application published as EP 1 988 000. However, such devices still need the cylinder to be manually shuffled between the platforms of the trolley and the welding apparatus.

SUMMARY

According to a first aspect of the invention, there is provided a lifting apparatus, comprising a frame and a carriage, the carriage being mounted on the frame through a mounting, the mounting allowing the carriage to rotate relative to the frame and to slide linearly relative to the frame constrained to a path, the carriage being provided with a loading surface for a load.

As such, by providing a combination of a pivoting motion and a sliding linear, but constrained motion, the lifting apparatus allows the load to be tipped relative to the apparatus and then slid, thus allowing a change of height of the load. This is a much more ergonomic solution than manual lifting. Furthermore, we have appreciated that, whilst this solution can be employed with the lifting of gas cylinders, it has wider application for lifting any load, especially those that are heavy and unwieldy.

The path will preferably comprise a straight line, although the path may be curved. Typically, the mounting will comprise a bar on one of the frame and the carriage and a track on the other of the frame and the carriage, the bar being captive within the track. Typically, the track will be on the frame and the bar will in the carriage. The track may comprise a slot in which the bar is captive, the bar and the slot both being elongate and having a length, the lengths of the bar and the slot being generally perpendicular. The slot may have a pair of parallel walls along the length of the slot; the parallel walls may constrain the bar against movement perpendicular to the length of the slot.

The path will typically have two ends, the carriage not being able to move past the ends of the path relative to the frame.

The bar may comprise a pair of wider portions between which there is a narrower portion. The narrower portions may fit between the parallel walls, whereas the wider portions may not. As such, the inability of the wider portions to fit between the parallel walls may constrain the bar against movement along its length. Therefore, the bar may be constrained to move along the length of the slot, but may be free to pivot about its own length.

The loading surface may be arranged so as to support the side of a load; it may support the side and not the bottom of the load. As such, the loading surface may correspond to that of the load; for a generally cylindrical load such as a gas cylinder, the loading surface may define part of a cylinder. The loading surface may be provided by a plurality of loading members, each providing a surface, the surfaces of the loading members all lying on the loading surface.

At least one end of the length of the slot may provide a bearing surface for the bar; as such, a user may find it easy to pivot the carriage at this point, as the bearing surface may transmit the weight of the load to the frame.

The carriage may also be provided with containment means by means of which the load can be attached to the carriage. These may comprise straps, chains or the like.

The apparatus may be provided with locking means to selectively prevent movement of the carriage relative to the frame. There may be at least one of a manual lock operable by a user and an automatic lock which acts to lock movement of the carriage relative to the frame dependent once the carriage moves past a given point relative to the frame.

The frame may be provided with locomotion means which allow the frame to be moved over a surface on which it is placed; the locomotion means may comprise at least one, but preferably two, wheels.

According to a second aspect of the invention, there is provided a method of moving an object having a bottom resting on a first surface to a second surface, the method comprising:

positioning a lifting apparatus according to the first aspect of the invention so that the loading surface is adjacent to the object on the first surface;

securing the object to the loading surface;

pivoting the carriage of the lifting apparatus relative to the frame so as to lift the bottom of the object off the first surface;

moving the lifting apparatus so that the bottom of the object is over the second surface; and sliding the carriage relative to the frame so that the object pivots about its bottom.

Thus, this provides a more ergonomic way of moving a potentially large and unwieldy object.

Where the second surface is higher than the first surface, the step of pivoting the carriage relative to the frame may include so pivoting the carriage until the bottom of the object is resting on the second surface; in such a case, the step of sliding the carriage relative to the frame will occur after the step of moving the lifting apparatus.

Where the second surface is lower than the first surface, the step of sliding the carriage so that the object pivots about its bottom may occur before the step of moving the lift apparatus and before the step of pivoting the carriage so as to lift the bottom of the object off the surface.

In both cases, the sliding movement, and the pivoting of the object about its bottom, allows for a change in height of the center of the object.

Typically, the step of pivoting the carriage will occur when the carriage is at an end of the path relative to the frame. In such a case, the bar is likely to be on one of the bearing surfaces, which will mean that the load is being supported by the frame rather than the user.

Typically, the step of securing the object to the loading surface will include attaching the object to the carriage, typically by means of the containment means.

BRIEF DESCRIPTION OF THE DRAWINGS

There now follows, by way of example only, description of embodiments of the invention, described with reference to the accompanying drawings, in which:

FIGS. 3 to 9 are side elevations of the lifting apparatus of FIG. 1, FIGS. 5 to 7 additionally showing a welding apparatus, showing the use of the lifting apparatus in lifting a gas cylinder on and off the welding apparatus.

DETAILED DESCRIPTION

Figure 1:
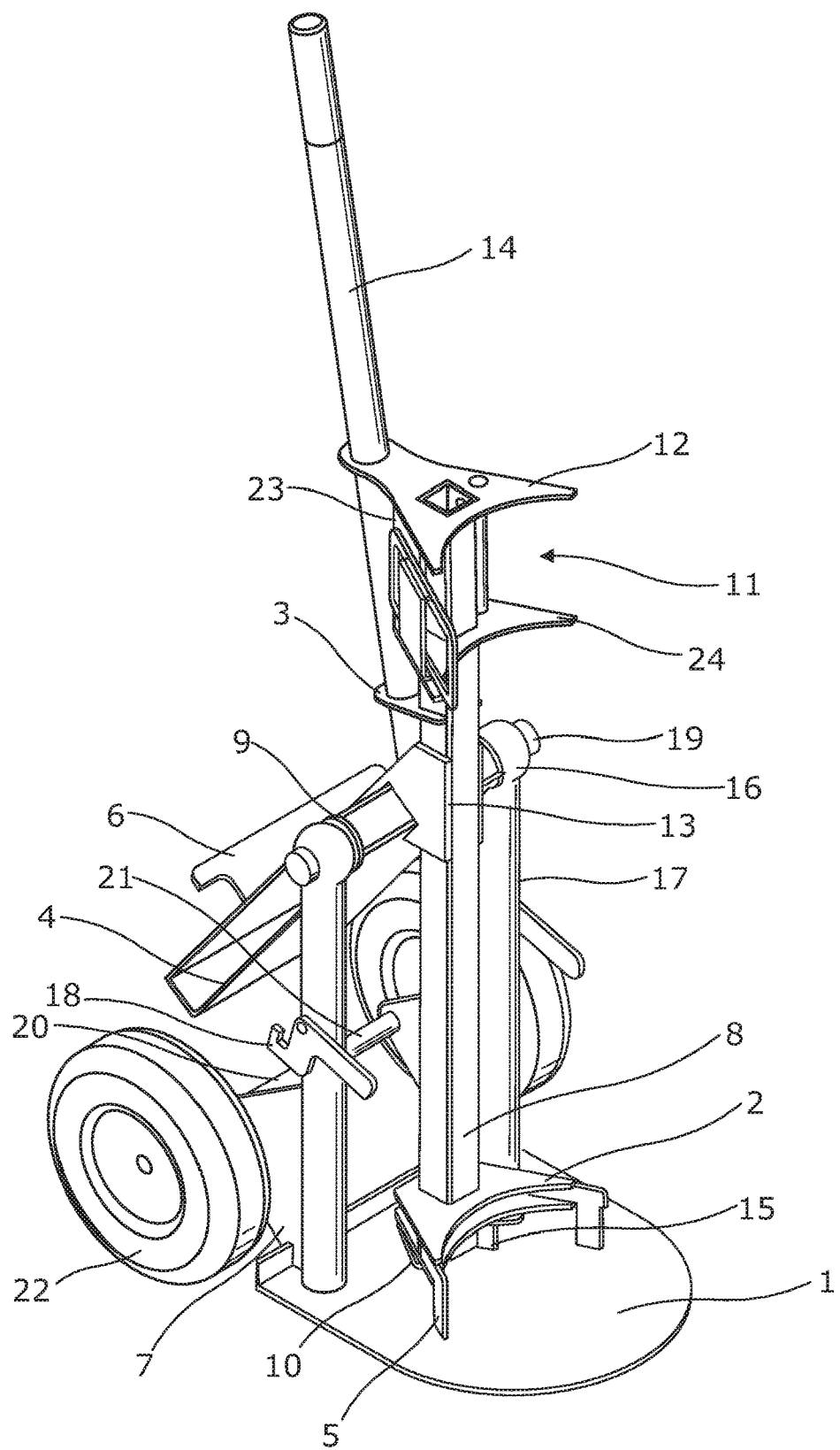
FIG. 1 is a front perspective view of a lifting apparatus in accordance with an embodiment of the invention.
Figure 2:
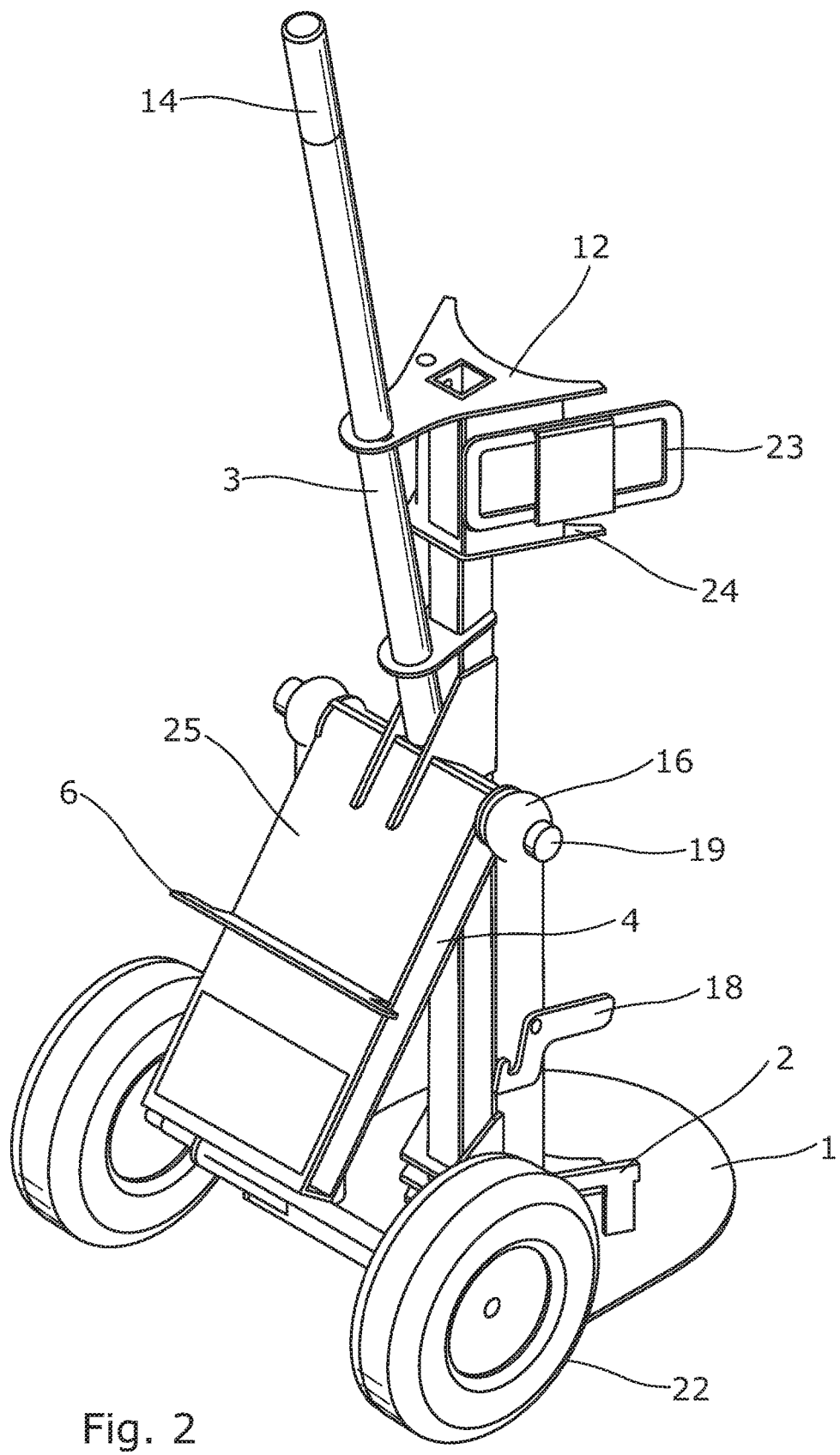
FIG. 2 is a rear perspective view of the lifting apparatus of FIG. 1.

A lifting apparatus in accordance with an embodiment of the invention is shown in FIGS. 1 to 9 of the accompanying drawings. It comprises a frame 1 supporting a carriage 3. The frame 1 runs over the floor or other surface on which the lifting apparatus is placed with, as will be explained below, the carriage 3 being supported by the frame 1. The frame 1 has wheels 22 by means of which it can be moved across the floor.

The carriage 3 is mounted on the frame 1 through a mounting 9, which comprises a bar 19 on the frame 1 held captive within a slot 4 in a track 25 on the carriage 3. The slot 4 is generally cuboid, with a width, a length and a depth, the depth being slightly larger than the thickness of the bar 19. The bar 19 is positioned in the slot parallel to the width and perpendicular to the length of the slot 4. The bar 19 has widened ends 16 relative to the remainder of the bar, set slightly larger than the width of the track 25.

As such, the bar 19 is free to pivot about its length in the slot 4, and so the carriage 3 can pivot about that axis relative to the frame 1. However, as far as linear movement is concerned, the bar 19 is constrained so that it can only move along the length of the slot, the walls of the track 25 which define the slot 4 not permitting movement of the bar 19 out of the depth of the slot and the widened ends 16 not allowing movement of the bar 19 along its own length. Thus, the carriage 3 can only move linearly relative to the frame 1 along a path defined by the length of the slot 4. Furthermore, the end walls of the slot at each end of the length of the slot (particularly that at the top of the slot 4) can each provide a bearing surface for the bar 19, so that the bar 19 can pivot in the slot 4 with the track 25 being supported through the bearing surface on the bar 19.

The carriage is provided with three loading members 2, 12, 24, which together define a loading surface, in that each of the loading members 2, 12, 24 have a load-bearing surface which lie on the common loading surface. In the present case, where the loading apparatus is to be used with a gas cylinder, the loading surface is part of the curved surface of a cylinder, and so each of the load-bearing surfaces lie on the same part-cylindrical surface.

The carriage is also provided with straps 23, which can be used to retain the load onto the carriage.

The frame 1 is furthermore provided with an automatic lock 18, which acts to prevent any rotation of the carriage 3 relative to the frame 1 past the point when a lock member 6 passes the lock 18. Once this occurs, the lock 18 will grasp 6 and prevent any further rotation of the carriage 3 relative to the frame 1 in any direction until the lock is released. This acts as a safety mechanism, and prevents the load from rotating too far backwards.

Thus, the lifting apparatus described above can be used to move, in this embodiment, a cylindrical gas cylinder, although the skilled man will appreciate that it could be modified, in particular by appropriate adaptation of the shape of the loading surface.

The use of this lifting apparatus to move a welding gas cylinder onto and off of a welding apparatus can be seen with respect to FIGS. 3 to 9 of the accompanying drawings. In these Figures, a lifting apparatus 100 is used to lift a gas cylinder 101 onto and off of the platform 102 of a welding apparatus 103.

The scenario starts with the gas cylinder 101 on a first surface 104 distant from the welding apparatus 103. The lifting apparatus 100 is brought adjacent to the cylinder 101, so that the cylinder 101 is laying on the loading members 2, 12, 24 making up the loading surface. The straps 23 are connected around the cylinder 101, so as to strap it to the carriage 3. A bolt 26 is used to lock the carriage 3 against rotation relative to the frame 1. The equipment is now in the position shown in FIG. 3 of the accompanying drawings.

The handle 14 of the carriage 3 can now be used to tilt the lifting apparatus 100 and the cylinder 101 backwards, as shown in FIG. 4 of the accompanying drawings, until the frame 1 is supported by the wheels 22. The apparatus can then be wheeled to approach the desired location adjacent to the welding apparatus 103.

Figure 5:
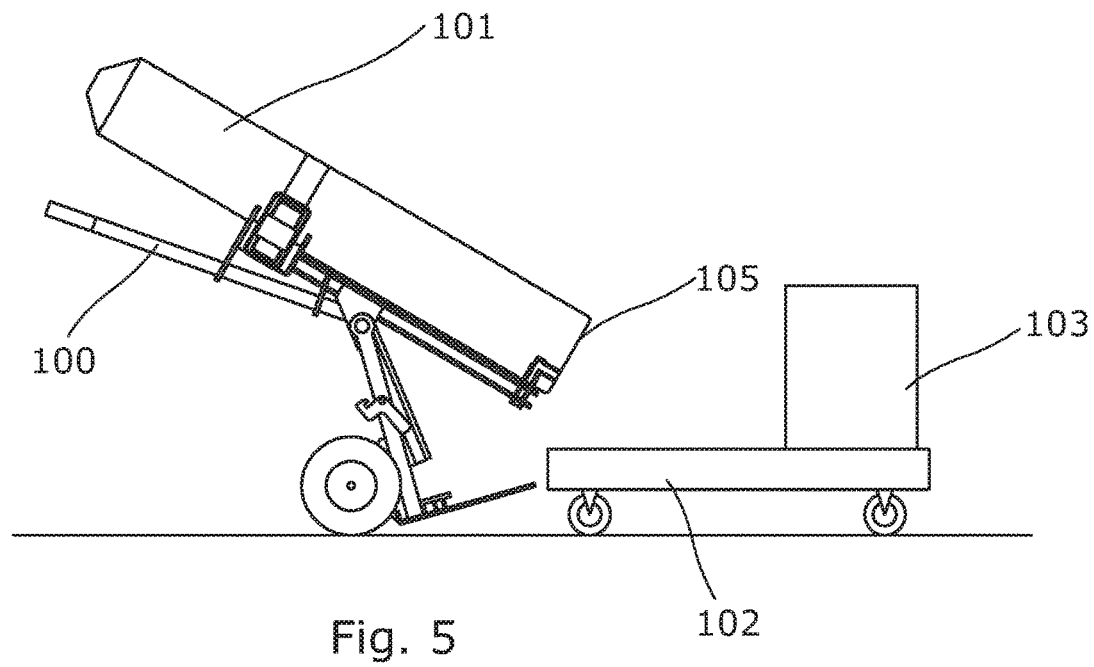
Figure 6:
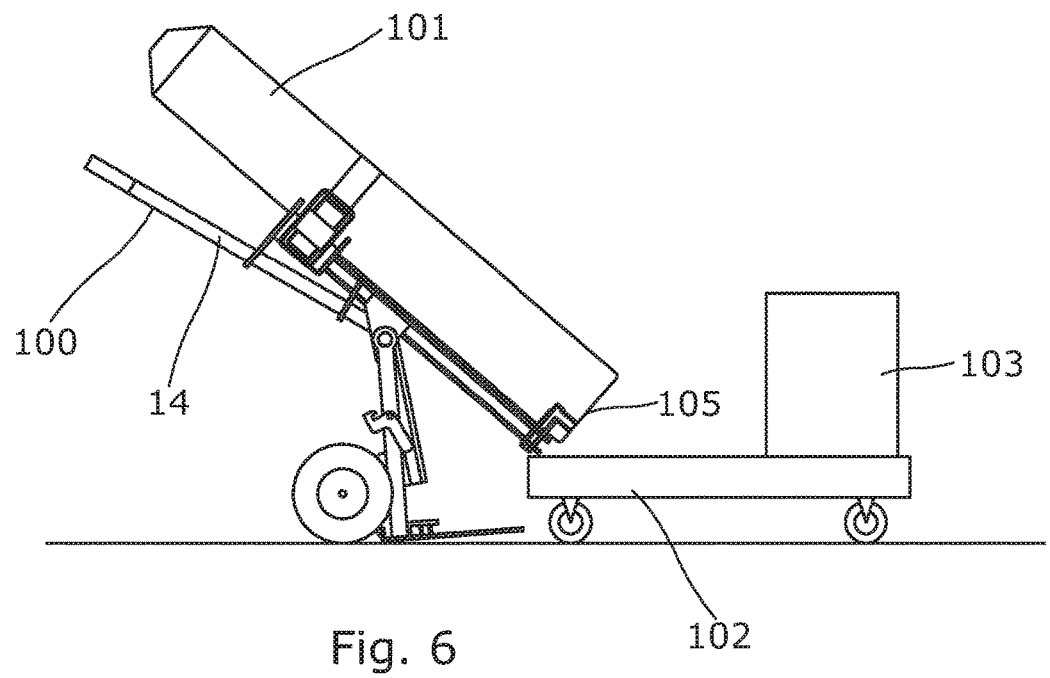

As shown in FIG. 5, the bolt 26 can then be released and the carriage 3 rotated relative to the frame 1 until the bottom 105 of the cylinder 101 is over the platform 102. At this point (as shown in FIG. 6 of the accompanying drawings), rather than pivoting about the bar 19, the cylinder 101 is now allowed to pivot about its own bottom 105. To do this, the handle 14 is pushed upwards, allowing the cradle 3 to move linearly relative to the frame 1.

Figure 7:
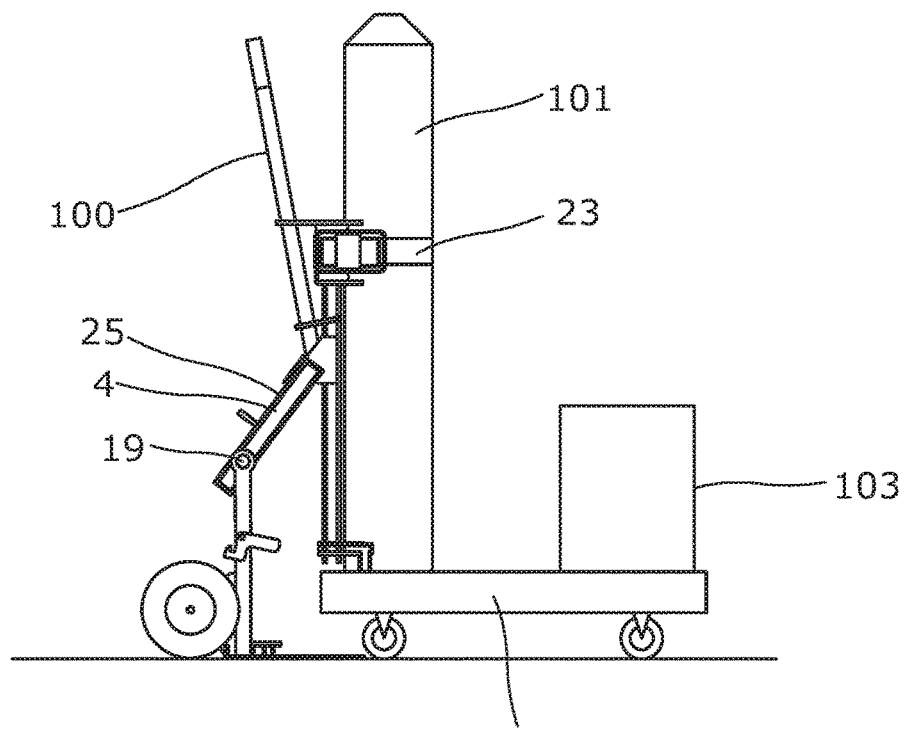

This movement is continued until the cylinder 101 is upright on the platform 102 as shown in FIG. 7 of the accompanying drawings. As can be seen from that Figure, the track 25 has moved relative to the bar 19, so that the bar 19 is now located in the lower reaches of the slot 4, rather than in the uppermost position, resting against the upper bearing surface, that it has previously been. The straps 23 can now be released.

In order to lift the cylinder 101 off of the platform, a similar technique is applied in reverse. The lifting apparatus 100, with the carriage 3 raised as shown in FIG. 7 of the accompanying drawings, is positioned adjacent to the cylinder 101. Spacers 5 on the carriage ensure that the carriage 3 is at the correct height relative to the frame 1, the spacers 5 being positioned so as to be in contact with the platform 102. The straps 23 are applied in order to secure the cylinder 101 to the carriage 3. The cylinder is then pivoted about its bottom 105, as shown in FIG. 6 of the accompanying drawings.

Figure 8:
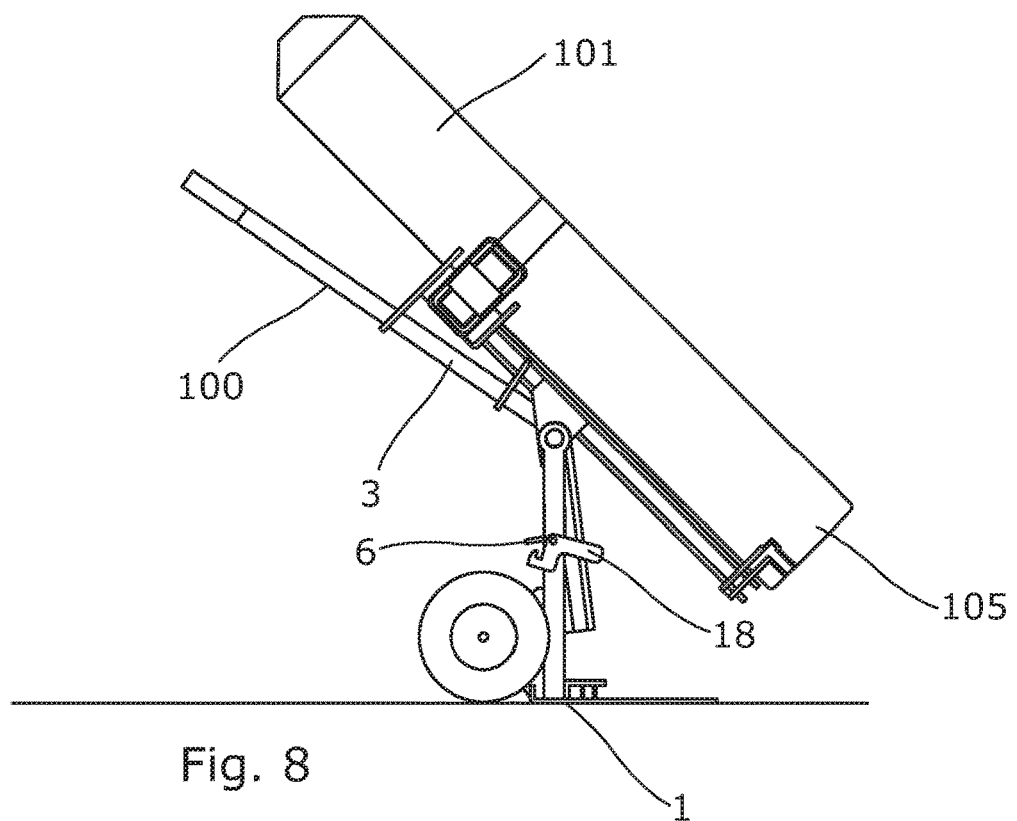
Figure 9:
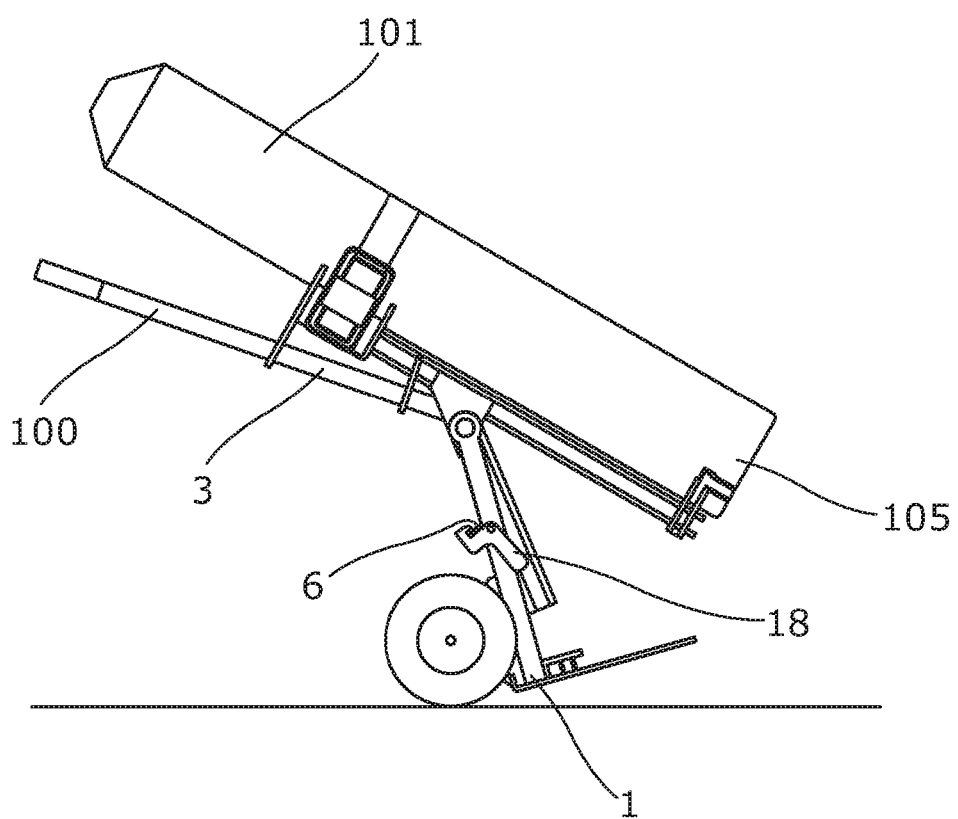

Because of the weight of the cylinder 101, a user will need to exert caution at this stage. However, the lock 18 will assist the user, as shown in FIGS. 8 and 9 of the accompanying drawings. Once the cylinder 101 has been tipped backwards the full amount, such that the bar 19 is in the top of the slot 4 (as shown in FIG. 8), the user can continue to pivot the cylinder backwards.

However, to prevent the carriage 3 and cylinder 101 from tipping too far (possibly leading to accidents should the cylinder overbalance backwards), the lock 18 will limit the amount of rotational travel. As shown in FIG. 9 of the accompanying drawings, once the lock 18 engages the lock member 6, no further rotation of the carriage 3 relative to the frame 1 will be possible until the user releases the lock.

With the lock 18 engaged, the user can then move the lifting apparatus on its wheels 22 slightly, until the cylinder is no longer over the platform 102. The lock 18 can be released, and the carriage 3 pivoted relative to the frame 1 until the cylinder is vertical (FIG. 3 of the accompanying drawings). The bolt 26 can be rearranged, and then the lifting apparatus moved until the cylinder 101 is in the desired location. The cylinder is then released.

It can therefore be seen that the lifting apparatus of this embodiment of the invention reduces the level of manual handling and particular the amount of manual lifting of the cylinder that is required; much of the weight of the cylinder can be supported by the lifting apparatus where previously it would need to have previously been supported by the user. Because the lifting of the cylinder is achieved generally by pivoting, be it about the bar 19 or the bottom 105 of the cylinder, the user can make use of considerable mechanical advantage. We believe this lifting apparatus provides a much safer, convenient and ergonomic solution to the problem of lifting gas cylinders in particular than the manual lifting that was previously required.

Figure 10:
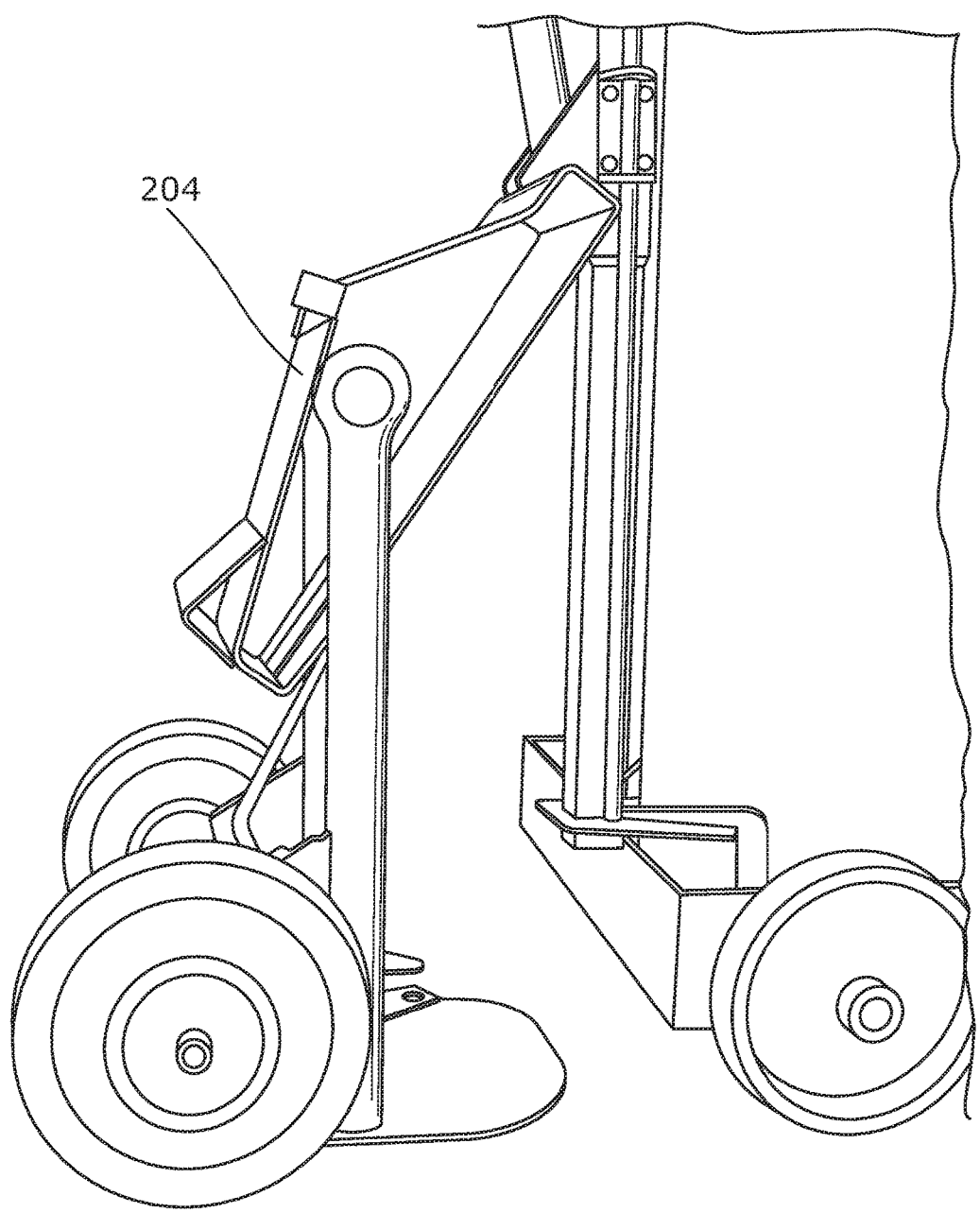
FIG. 10 shows a side elevation of a lifting apparatus in accordance with an alternative embodiment of the invention.

In an alternative embodiment, shown in FIG. 10 of the accompanying drawings, the slot 104, rather than being cuboid, is of the form of a pentagonal prism, in that the rear wall of the slot has been stretched backwards. We have found that this improves the ease of use of the device when tipping a cylinder off of a platform, particularly where the platform is at a relatively low height.

The invention claimed is:

1. A lifting apparatus, comprising a frame and a carriage, the carriage being mounted on the frame through a mounting, the carriage being provided with a loading surface for a load having a bottom, the mounting comprising a bar on one of the frame and the carriage and a track on the other of the frame and the carriage, the bar being captive within the track allowing the carriage to rotate relative to the frame about the bar and to slide linearly relative to the frame constrained to a path defined by the track, such that the load can be pivoted about its bottom.

2. The lifting apparatus of claim 1, in which the path comprises a straight line.

3. The lifting apparatus of claim 1, in which the path has two ends, the carriage not being able to move past the ends of the path relative to the frame.

4. The lifting apparatus of claim 1, wherein the bar is on the frame and the track is on the carriage.

5. The lifting apparatus of claim 4, in which the track comprises a slot in which the bar is captive, the bar and the slot both being elongate and having a length, the lengths of the bar and the slot being generally perpendicular to each other.

6. The lifting apparatus of claim 5, in which the bar comprises a pair of wider portions between which there is a narrower portion, wherein the narrower portion fits between a pair of parallel walls of the slot, whereas the pair of wider portions do not fit between the pair of parallel walls.

7. The lifting apparatus of claim 5, in which at least one end of the length of the slot provides a bearing surface for the bar.

8. The lifting apparatus of claim 1, in which the loading surface is arranged so as to support a side of a load and not the bottom of the load.

9. The lifting apparatus of claim 8, in which the loading surface corresponds to a surface of the load.

10. The lifting apparatus of claim 9, in which the load is generally cylindrical and the loading surface defines part of a cylinder.

11. The lifting apparatus of claim 1, in which the loading surface is provided by a plurality of loading members, each providing a surface.

12. The lifting apparatus of claim 1, provided with locking means to selectively prevent movement of the carriage relative to the frame.

13. The lifting apparatus of claim 1, in which the frame is provided with locomotion means which allow the frame to be moved over a surface on which it is placed.

14. The combination of a load and a lifting apparatus comprising a frame and a carriage, the carriage being mounted on the frame through a mounting, the carriage being provided with a loading surface for the load having a bottom, the mounting comprising a bar on one of the frame and the carriage and a track on the other of the frame and the carriage, the bar being captive within the track allowing the carriage to rotate relative to the frame about the bar and to slide linearly relative to the frame constrained to a path defined by the track, such that the load, which is loaded onto the loading surface, can be pivoted about its bottom.

15. The combination of claim 14, in which the load is a gas cylinder.

16. A method of moving an object having a bottom resting on a first surface to a second surface, the method comprising:
  providing a lifting apparatus comprising a frame and a carriage, the carriage being mounted on the frame through a mounting, the mounting allowing the carriage to rotate relative to the frame and to slide linearly relative to the frame constrained to a path, the carriage being provided with a loading surface for a load;
  positioning the lifting apparatus such that the loading surface is adjacent to the object on the first surface;
  securing the object to the loading surface;
  pivoting the carriage of the lifting apparatus relative to the frame so as to lift the bottom of the object off the first surface;
  moving the lifting apparatus so that the bottom of the object is over the second surface; and
  sliding the carriage relative to the frame so that the object pivots about its bottom.

17. The method of claim 16, in which the second surface is higher than the first surface and the step of pivoting the carriage relative to the frame includes pivoting the carriage until the bottom of the object is resting on the second surface, with the step of sliding the carriage relative to the frame occurring after the step of moving the lifting apparatus.

18. The method of claim 16, in which the second surface is lower than the first surface.

19. The method of claim 16, in which the step of pivoting the carriage will occur when the carriage is at an end of the path relative to the frame.

\* \* \* \* \*